United States Patent [19]
Bergetz

[11] Patent Number: 5,169,116
[45] Date of Patent: Dec. 8, 1992

[54] MOUNTING LUG FOR TELEVISION OR SIMILAR APPLIANCE

[76] Inventor: Carl A. Bergetz, 7805 Greenfield St., River Forest, Ill. 60305

[21] Appl. No.: 732,821

[22] Filed: Jul. 19, 1991

[51] Int. Cl.⁵ .............................................. F16M 3/00
[52] U.S. Cl. ................................ 248/680; 248/205.3; 248/903
[58] Field of Search .............. 248/680, 551, 500, 506, 248/154, 177, 205.3, 903, 683, 310

[56] References Cited

U.S. PATENT DOCUMENTS

| | | |
|---|---|---|
| 3,246,439 | 4/1966 | Foster et al. . |
| 3,880,535 | 4/1975 | Durham et al. . |
| 3,908,942 | 9/1975 | Keith et al. ........................ 248/551 |
| 3,913,876 | 10/1975 | McSherry .................... 248/205.3 X |
| 4,167,259 | 9/1979 | Bury ................................. 248/205.3 |
| 4,170,995 | 10/1979 | Levine et al. . |
| 4,390,576 | 6/1983 | Hutter . |
| 4,691,891 | 9/1987 | Dionne ............................ 248/551 X |
| 4,822,224 | 4/1989 | Carl et al. . |
| 4,842,912 | 6/1989 | Hutter . |
| 4,878,645 | 11/1989 | O'Neill ................................ 248/680 |
| 4,946,127 | 8/1990 | Kulaga ................................ 248/551 |

*Primary Examiner*—Ramon O. Ramirez
*Attorney, Agent, or Firm*—Angelo J. Bufalino

[57] ABSTRACT

A mounting fixture for an electrical appliance such as a television receiver includes a mounting lug with a substantially planar support member and a generally cylindrical base member extending therefrom, wherein the base member and support member are integrally formed with each other and are further interconnected by radial ribs integrally formed with said base and support members. The base member may include either a fastener integral therewith or a fastener receptacle disposed in a boss, which are used to attach the mounting lug to a support surface within a depression thereon by way of either a fastening nut or screw. The support member further includes a layer of contact pressure sensitive adhesive which permits the mounting lug to be easily secured to the cabinet or exterior of the electrical appliance.

10 Claims, 2 Drawing Sheets

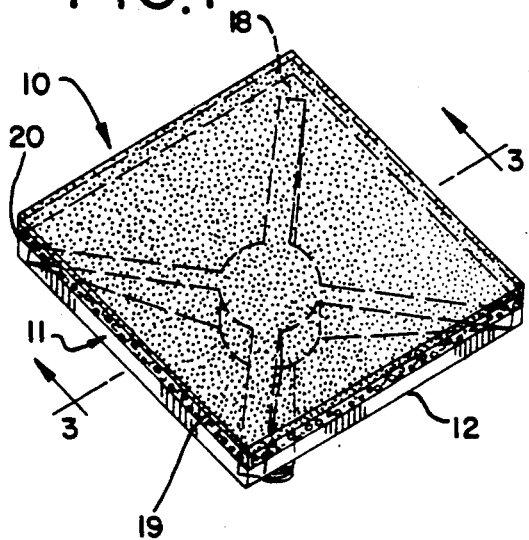
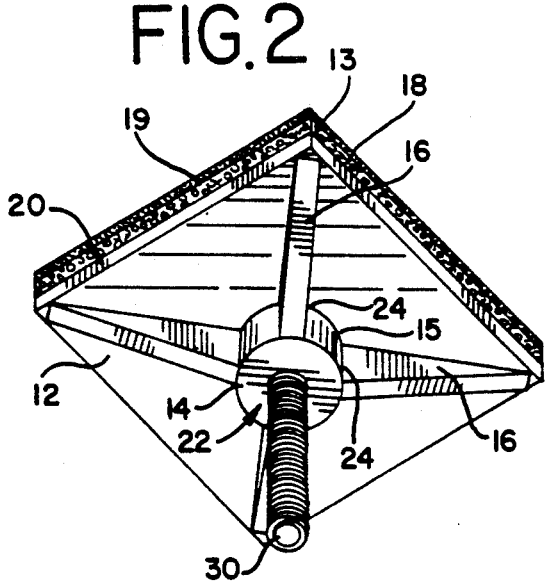
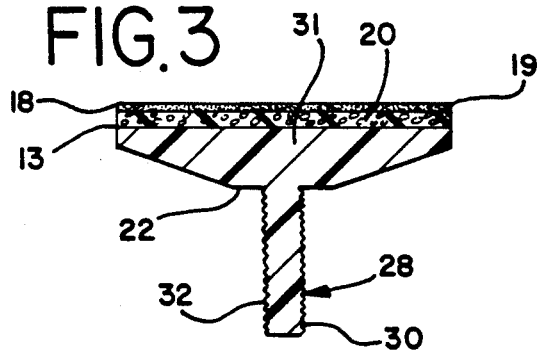
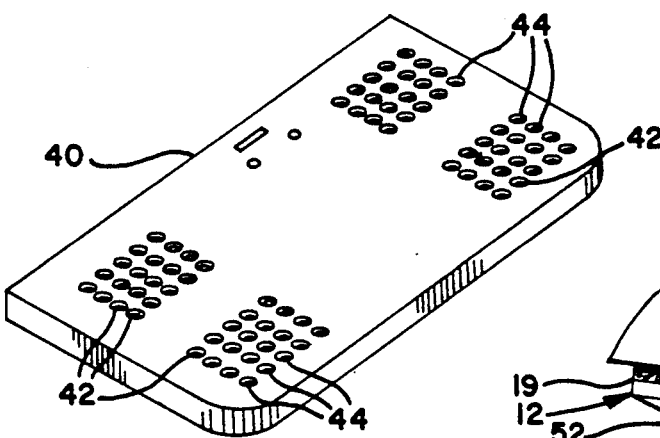
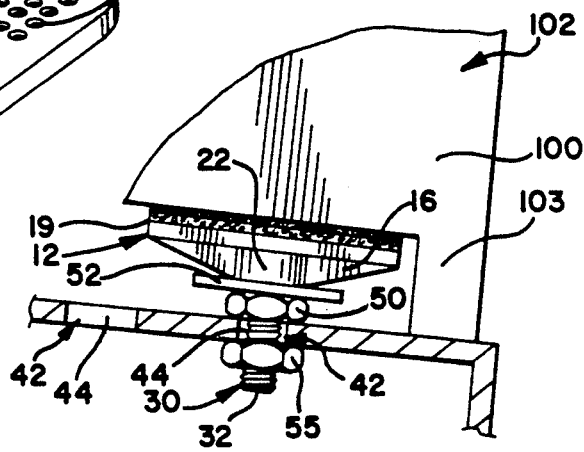

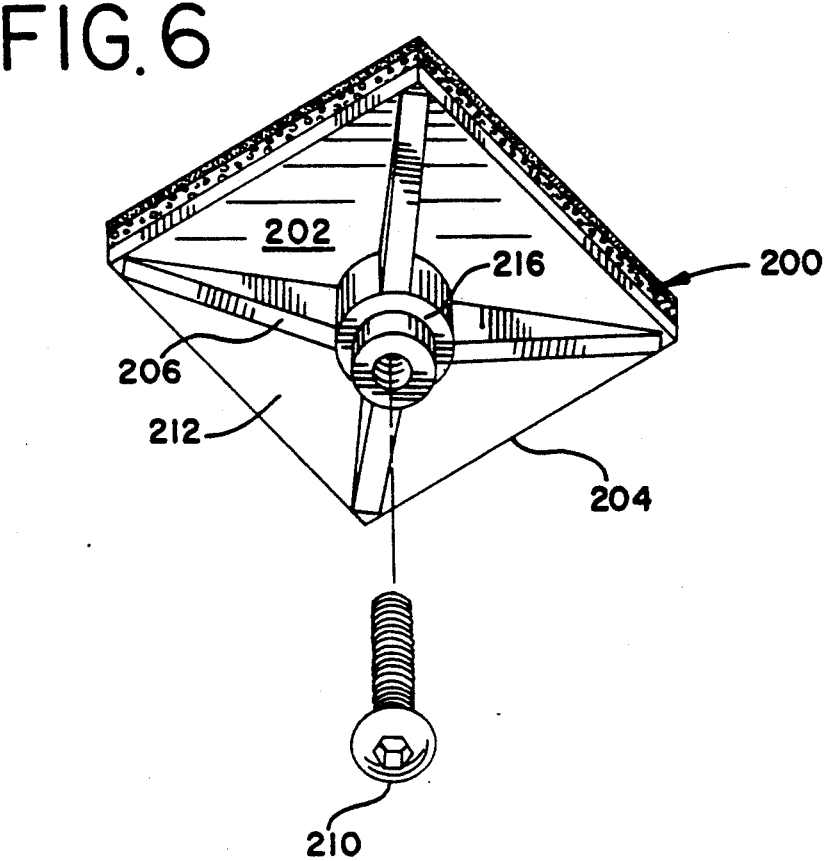
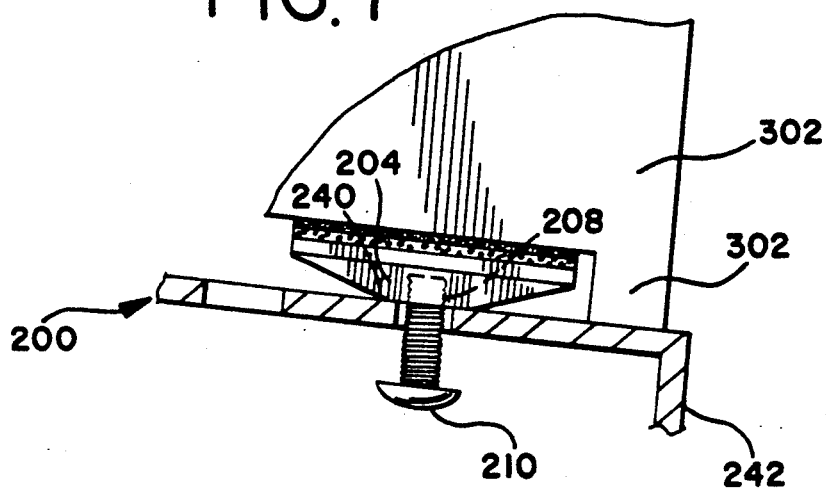

MOUNTING LUG FOR TELEVISION OR SIMILAR APPLIANCE

BACKGROUND AND SUMMARY OF INVENTION

The present invention relates generally to means for mounting televisions and similar appliances to support surfaces and, more particularly, to a mounting lug for reliably and inexpensively securing a television to a support tray or substrate in a manner which prevents the television from falling off of the support tray.

Electrical appliances, such as television receivers and the like, have previously been secured to support trays or other similar working surfaces with conventional securing systems utilizing multiple pieces of hardware, such as clips, plates, cables and the like. This multiple hardware frequently requires good manual dexterity and extensive time to assemble the securing system. Most such securing systems are expensive not only due to the numerous pieces required to constitute the securing system, but also due to the time required to assemble the system.

One method of mounting televisions involves the use of a series of "bosses" formed in the television housing or cabinet and located on the underside of the television receiver. Typically, such a mounting boss projects downward from the cabinet and engages an aperture or opening positioned in a mounting plate. The television, by way of the boss, is then secured by fasteners or other similar devices to a support tray or stand. Forming such mounting bosses in the exterior cabinet of a television receiver requires modification of an existing television cabinet mold, which is impractical and expensive. For mounting the television, the position of the mounting bosses on the television cabinet dictates that the openings into which the bosses sit in the support tray be accurately positioned in the support tray. Where the apertures are not accurately aligned, the securing system is essentially inoperable. Additionally, the mounting bosses are adapted to be received only by one opening in the support tray, thereby providing only one position in which the television would take on the support tray. Moreover, such mounting bosses may be easily broken off when the television is moved.

The present invention is directed to a mounting fixture and mounting system which overcomes the disadvantages typically experienced with a typical mounting boss securement system. The present invention is directed to a mounting fixture in the form of a lug member which may have a fastener member formed integral therewith which can be easily attached to the base of a television receiver or similar appliance by way of a suitable adhesive means. Alternatively, the lug member may also receive a fastener member in a threaded recess thereof. The invention is also directed to a combined assembly which includes a support tray and a plurality of mounting lug receiving openings disposed therein in a preselected pattern, wherein each such opening is adapted to receive in an engaging fashion at least one engagement or mounting surface of the mounting lug.

The mounting lug includes a television support or bearing member with a planar surface having a suitable adhesive means affixed thereto and a fastener or a fastener receptacle embedded in a base portion integrally formed with the support member, which base portion depends downwardly from the support plate. In some instances, the fastener member receives an adjustment means in the form of a nut which is located proximate to the base portion of the mounting lug. The nut may be mounted on a threaded shaft of the mounting lug to enable adjustment of the television cabinet with respect to the support tray. In instances where a fastener member is not formed integral with the base portion, the base portion may include a fastener receptacle in the form of a projecting boss.

The mounting lug further includes a series of radial reinforcement ribs. A series of recesses are arranged in the support tray in a preselected pattern, which recesses accommodate either the fastener member or fastener receptacle boss. The recesses give the user of the mounting lug a variety of positions on the television cabinet to place the mounting lug. The mounting lug fastener member or fastener boss are integrally formed with the body of the mounting lug and the radial member ribs provide the reinforcement to the lug and reinforce it against breaking off due to the loads imposed by the television receiver.

Accordingly, it is a general object of the present invention to provide a mounting lug for use with a television receiver, or similar appliance, which may be easily and reliably secured to an exterior cabinet surface thereof, and which permits the appliance to be easily mounted on a support tray.

Another object of the present invention is to provide a mounting lug for a television receiver having an adhesive mounting surface on one end and a fastener member, such as a threaded bolt, integrally formed in a base portion on the opposite end of the mounting lug, the bolt being received in any one of a plurality of openings disposed in a support tray.

A further object of the present invention is to provide a mounting lug for use with an electrical appliance such as a television receiver, which mounting lug has adhesive means associated therewith for adhesive attachment to the cabinet of the television receiver, and wherein the mounting lug includes a support tray fastening member integrally molded into a base portion of the mounting lug, the fastener member being adapted to be received any one of a plurality of mounting apertures disposed on a support tray, the mounting lug being supported on the support tray by a retaining nut mounted thereon.

A yet further object of the present invention is to provide a series of mounting lugs in combination with a television receiver support tray and the support tray having a series of openings each adapted to engage any one of the mounting lugs, the mounting lugs including a base portion having fastener means integrally formed therein, the base portion extending outwardly to define a support portion of the mounting lug, the support portion having adhesive means disposed thereon for attachment to the television receiver, the mounting lug base portion having a projecting portion which operatively engages a support tray recess, the mounting lug portion, and support portion being further interconnected by a plurality of rib members.

Still another object of the present invention is to provide a combination of a series of mounting lugs and a support tray having a series of recesses disposed therein in a prearranged pattern, the mounting lugs having adjustable means thereon.

These and other objects feature an advantage of the present invention which is apparent from a reading of the following detailed description taken in conjunction with the accompanying drawings wherein like reference numerals refer to like parts.

BRIEF DESCRIPTION OF THE DRAWINGS

In the course of this detailed description, reference will be made to the attached drawings in which:

FIG. 1 is a perspective view of one embodiment of a mounting lug constructed in accordance with the principles of the present invention;

FIG. 2 is a perspective view of the mounting lug shown in FIG. 1 viewed from the bottom;

FIG. 3 is a sectional view of the mounting lug of FIG. 1 taken along lines 3—3;

FIG. 4 is a perspective view of a support tray specifically designed for use with the lug of FIG. 1;

FIG. 5 is an enlarged sectional view of the mounting lug of FIG. 1 in place upon the support tray of FIG. 4;

FIG. 6 is a perspective view of another embodiment of a mounting lug constructed in accordance with the principles of the present invention; and FIG. 7 is a sectional view of the mounting lug of FIG. 7 in place upon the support tray of FIG. 4.

DETAILED DESCRIPTION OF THE PREFERRED EMBODIMENTS

FIG. 1 illustrates a mounting fixture 10 constructed in accordance with the principles of the present invention. As shown, the mounting fixture 10 includes a lug 11 having a generally planar bearing plate 12, a base portion 14, and a series of reinforcement ribs 16. The mounting lug 10 is typically attached to the base or exterior cabinet portion 100 of a television receiver 102 (FIG. 5) within the television cabinet support feet 103. Such attachment is most easily effected by way of suitable adhesive means such as a layer 18 of a contact or pressure-sensitive adhesive 19 disposed on the bearing plate 12. As is commonly used with such adhesive layers 18, an intervening foam layer 20 may be present between the adhesive layer 18 and the contact face 13 of the bearing plate 12.

As mentioned above, the bearing plate 12 includes a base portion 14, shown as a generally cylindrical boss 22 which depends downwardly from the bearing plate 12. A series of radially extending ribs 16 extend outwardly from the boss 22 and provide reinforcement to the junction or union 24 which occurs between the bearing plate 12 and the boss 22 and to provide a measure of structural resistance to the base portion 14 to resist loads applied thereto when the television 100 is adjusted in place on the support tray 40. In this regard, the ribs 16 extend generally diagonally from the end 23 of the boss downwardly to the edge 15 of the bearing plate 12 at an angle therefrom. The ribs 16 are preferably arranged equidistantly around the circumference of the boss 22 to provide the most advantageous support and engagement for the support tray.

A fastener member 28, such as a threaded screw 30, is formed integrally with the boss 22 as one-piece and extends downwardly from the interior of the boss 22 for a predetermined length which permits the screw shank 32 to easily pass through a support tray aperture 42 and thus provides a threaded member to which a conventional retaining nut 55 may be applied. The fastener member 28 is firmly embedded within the central body portion 25 of boss 22. The mounting lug and associated fastener 28 are preferably injection molded from a durable plastic material such as nylon or delrin.

The mounting lug 11 is designed to reliably engage a television support tray 40. In this regard, a series of openings or apertures 42 are formed in the appliance support tray 40 in a suitable pre-arranged pattern shown as four quadrants or arrays 41 disposed generally proximate to the corners of the support tray 40. The number of apertures 42 is not critical, however, it has been found that four quadrants, each containing 95 apertures 42 give desirable results for the support tray 40 illustrated in FIG. 4. The apertures 42 preferably take the form of circular openings 44 having a diameter of approximately 0.625 inches. Because the mounting lugs 10 are attached to the television cabinet 102 within the support feet 103 thereof, the mounting lugs 10 are each provided with an adjustment means in the form of an adjustment nut 50 which engages the screw shank 32. The nut 50 may be moved up or down along the shank 32 of screw 30 so that the nut 50 will positively engage the support tray 40 surrounding the openings 44.

An additional member, such as a washer 52 may also be disposed on the screw shank 32 above the adjustment nut 50. The adjustment nut 50 preferably has a diameter greater than that of the support tray opening 44 in which the screw 30 is received in, such that a support face 52 of the adjustment nut 50 bears against the support tray 40. A second nut 5 engages the screw 30 beneath the support tray 40 and serves to retain the mounting lug in place upon the support tray 40.

In installation, the mounting lug 10 is applied to the television receiver cabinet 102 by pressing the adhesive layer 19 against the bottom of the cabinet 102 within the support feet 103. The adjustment nut 55 may then be rotated on the screw 30 to ensure that it supportingly contacts the support tray 40 in a manner such that the television receiver 102 is also supported by its own mounting feet 103.

As mentioned above, the support tray apertures 42 are preferably arranged in a preselected or random pattern on the support tray 12 (FIG. 4) wherein the openings 4 thereof are spaced apart from each other a preselected distance. Thus, the exact position of the television 100 is not necessary because any combination of openings 42 may be then utilized to support the television 100. Preferably, the diameter of the opening 4 slightly greater than the diameter of the mounting lug screw 30. In this regard, the present invention lends itself to be particularly useful on television or electrical appliances with irregular continuous geometry.

Turning now to FIGS. 6 and 7, a second embodiment of a mounting lug 200 constructed in accordance with the principles of the present invention is shown. This embodiment is particularly suitable for applications wherein the television receiver cabinet 302 has one or more bosses integrally formed therewith and which one may have broken off of the cabinet 302. The mounting lug 200 has a support portion 202 similar to that of the embodiment depicted in FIGS. 1-4. A base portion or boss 204 depends downwardly from the support portion 202 and is reinforced by a series of radial ribs 206. The boss 204 has a threaded opening 208 adapted to threadedly engage a security-style screw 210. As shown best in FIG. 7, the boss 204 depends downwardly, when attached, to contact an opposing surface 240 of the support tray 242. The security screw 210 is then threaded into the opening 208 of the boss 204 to affix the mounting lug 20 to the support tray 242.

It will be appreciated that the embodiments of the present invention that have been discussed hereto are merely illustrative of the few applications of the principles of the invention. Numerous modifications may be made by those skilled in the art without departing from the true spirit of the invention.

I claim:

1. A mounting fixture for mounting an electrical appliance, such as a television receiver, onto a substrate, the mounting fixture comprising: a support plate for supportingly contacting the appliance, the support plate including means for attaching said support plate to said appliance, the attachment means including a layer of contact adhesive disposed on a substantially planar surface of said support plate, said mounting fixture further including a base member extending downwardly from said support plate, fastener means secured in the base member extending outwardly from said base member, reinforcement means in the form of at least one radially extending rib member extending between and interconnecting said base member and support plate, said fastener means including an adjustment member for adjusting the position of said mounting fixture with respect to said substrate, said fastener means further including a threaded bolt integrally molded within said base member and said adjustment means further including a threaded nut, the threaded nut being disposed on said threaded bolt and being adapted to engage said substrate.

2. The mounting fixture of claim 1, wherein said mounting fixture includes four rib members disposed at substantially equal intervals around a circumference of said base member.

3. The mounting fixture of claim 1, wherein said contact adhesive is a pressure-sensitive adhesive.

4. The mounting fixture of claim 1, wherein said support plate, base member and rib member are integrally molded as one piece.

5. In combination, a mounting system for securing various electrical appliances such as a television to a support surface, the mounting system including at least one mounting lug having a substantially planar bearing plate member and a generally cylindrical base member extending outwardly and angularly from the bearing plate member, said mounting lug including a layer of contact adhesive adapted to adhesively engage said appliance, the base member being interconnected to said bearing plate member by a plurality of reinforcement rib members extending radially from said base member to said bearing plate member, said base member having an attachment portion extending outwardly therefrom, said attachment portion being adapted to engage a support washer, said support surface having a plurality of mounting apertures disposed therein in a preselected pattern, each of said support surface mounting apertures being surrounded and defined by a sidewall, each aperture being adapted to receive therein said mounting lug attachment portion, said support washer engaging said mounting lug attachment portion and extending radially outwardly therefrom to engage said support surface, said support washer having an outer diameter which is greater than an outer diameter of said apertures, said fastener means further including an adjustment member engaging said fastener means beneath said member support surface, said adjustment member being capable of applying an adjusting force to said mounting lug to adjust the position of said mounting lug with respect to said support surface.

6. The combination of claim 5, wherein said mounting lug includes a fastener member integrally formed in said base member and said adjustment member includes a retaining nut.

7. The combination of claim 5, wherein said mounting lug bearing member includes a boss portion having a threaded receptacle adapted to engage a screw.

8. The combination of claim 7, wherein said mounting lug includes four rib members disposed at intervals around a circumference of said base member.

9. A mounting fixture for mounting an electrical appliance, such as a television receiver, onto a substrate, the mounting fixture comprising: a support plate for supportingly contacting the appliance, the support plate including means for attaching said support plate to said appliance, the attachment means including a layer of contact adhesive disposed on a substantially planar surface of said support plate, said mounting fixture further including a base member extending downwardly from said support plate, fastener means extending outwardly from said base member, reinforcement means in the form of at least one radially extending rib member extending between and interconnecting said base member and support plate, said fastener means including an adjustment member for adjusting the position of said mounting fixture with respect to said substrate, said fastener means including a boss having a threaded receptacle adapted to engage a security screw.

10. The mounting fixture of claim 9, wherein said support plate, base member and rib member are integrally molded as one piece.

* * * * *